US005928596A

United States Patent [19]
McLeod et al.

[11] Patent Number: 5,928,596
[45] Date of Patent: Jul. 27, 1999

[54] APPARATUS AND PROCESS FOR DISTRIBUTING MOLTEN THERMOPLASTIC POLYMERS FROM MELT POLYMERIZATION TO MOLDING MACHINES

[75] Inventors: Andrew Ervin McLeod, Cockermouth, United Kingdom; Douglas Mark Haseltine, Kingsport, Tenn.; Larry Cates Windes, Kingsport, Tenn.; Marc Alan Strand, Kingsport, Tenn.

[73] Assignee: Eastman Chemical Company, Kingsport, Tenn.

[21] Appl. No.: 08/951,595

[22] Filed: Oct. 16, 1997

Related U.S. Application Data

[63] Continuation-in-part of application No. 08/498,404, Jul. 5, 1995, abandoned.

[51] Int. Cl.$^6$ .......................... B29C 45/12; B29C 45/46; B29B 15/00
[52] U.S. Cl. .................... 264/297.2; 264/328.8; 264/328.17; 425/557; 425/572; 425/588
[58] Field of Search .................... 264/297.2, 328.8, 264/328.19, 328.17; 425/130, 557, 558, 562, 567, 572, 585, 586, 587, 588

[56] References Cited

U.S. PATENT DOCUMENTS

| | | | |
|---|---|---|---|
| 3,117,348 | 1/1964 | Rees | 425/166 |
| 3,353,209 | 11/1967 | Schad | 264/328.17 |
| 4,192,637 | 3/1980 | Chong | 425/140 |
| 4,242,073 | 12/1980 | Tsuchiya et al. | 425/572 |
| 4,717,324 | 1/1988 | Schad et al. | 425/130 |
| 4,734,243 | 3/1988 | Kohama et al. | 425/588 |
| 4,863,369 | 9/1989 | Schad et al. | 425/588 |
| 5,028,226 | 7/1991 | De'ath et al. | 425/130 |
| 5,069,840 | 12/1991 | Arnott | 425/572 |
| 5,499,652 | 3/1996 | Schnaus et al. | |

Primary Examiner—Jill L. Heitbrink
Attorney, Agent, or Firm—Karen A. Harding; Harry J. Gwinnell

[57] ABSTRACT

A process and apparatus for distributing molten thermoplastic material supplied directly from melt polymerization to a plurality of molding machines operating in timed sequence is disclosed. The invention is particularly applicable to transferring molten polyester (normally polyethylene terephthalate or a copolymer thereof) directly from a melt polymerization reactor to injection molding machines for producing molded plastic articles.

8 Claims, 4 Drawing Sheets

APPARATUS AND PROCESS FOR DISTRIBUTING MOLTEN THERMOPLASTIC POLYMERS FROM MELT POLYMERIZATION TO MOLDING MACHINES

RELATED APPLICATION INFORMATION

This application is a continuation-in-part of U.S. Ser. No. 08/498,404 filed Jul. 5, 1995, now abandoned.

TECHNICAL FIELD OF THE INVENTION

The present invention relates to a process and apparatus for distributing molten thermoplastic material to a plurality of molding machines operating in timed sequence. The invention is particularly applicable to transferring molten polyester (normally polyethylene terephthalate or a copolymer thereof) directly from melt polymerization to injection molding machines for producing molded plastics articles.

BACKGROUND OF THE INVENTION

In the production of most molded articles from molten thermoplastic material, it is conventional practice to first solidify and pelletize the material. Pellets may then be stored and used at a later time in molding processes. The present invention is especially useful with respect to condensation polymers such as polyethylene terephthalate (PET) and the transfer of this material in molten form directly from melt polymerization to a plurality of molding machines which are operated in timed sequence such that the flow of material is substantially constant.

U.S. Pat. No. 4,470,796 relates to a method and apparatus of making hollow plastic articles in which the preforms or other articles are sequentially molded from a continuous stream of plasticized resin supplied by an extruder. The preforms are formed sequentially in a plurality of molds and immediately transferred from the molds to blowing apparatus where they are blown into plastic articles.

SUMMARY OF THE INVENTION

According to the present invention, there is provided an apparatus for producing molded thermoplastic articles comprising a) supply means forming a continuous supply of molten thermoplastic material directly from melt polymerization, b) a distributor connected to the supply means for receiving the material therefrom, c) means for feeding the material to said distributor, d) conduits connecting the distributor to intakes of a plurality of molding machines, the conduits being of substantially equal length and shaped to allow substantially uninterrupted flow of the material at substantially equal residence times therethrough, e) means for actuating each of the molding machines in a predetermined timed sequence to accept a charge of the material and form it into a molded article such that the flow of material through the distributor is substantially constant, f) means for ejecting the molded article, and g) means for repeating steps e) and f) in sequence.

Also, according to the present invention, there is provided a method for producing molded thermoplastic articles comprising a) supplying a continuous feed of molten thermoplastic material directly from melt polymerization, b) distributing the continuous feed to the intakes of a plurality of molding machines through conduits of substantially equal lengths and shaped to allow substantially uninterrupted flow of the material therethrough, c) opening the intakes of each of the molding machines in a predetermined sequence to accept a charge of the material, wherein the flow of material through the distributor is substantially constant, d) molding an article in at least two of the plurality of molding machines, and e) ejecting each of the articles after it is molded.

DETAILED DESCRIPTION OF THE INVENTION

The present invention relates to a distribution system and method for producing thermoplastic molded articles from polyesters directly from melt polymerization. More specifically, the present invention removes the conventional pelletization and remelting steps between melt polymerization and molding.

Polymers that are particularly useful in this process include poly(ethylene terephthalate), poly(ethylene naphthalenedicarboxylate), and copolyesters containing up to about 50 mol % of modifying dibasic acids and/or glycols. Modifying dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like.

Highly useful naphthalenedicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 1,8-isomers may also be used. The dibasic acids may be used in acid form or as their esters such as the dimethyl esters for example.

Typical modifying glycols may contain from about 3 to about 10 carbon atoms and include propylene glycol, 1,3-propanediol, 1,4-butanediol, 1,6-hexanediol, diethylene glycol, 1,4-cyclohexanediol, 1,4-cyclohexanedimethanol, and the like. The 1,4-cyclohexanedimethanol may be in the cis or the trans form or as cis/trans mixtures.

It is important that the inherent viscosity (I.V.) of the thermoplastic material be suitable for molding. Generally, the I.V. should be within the range of about 0.65 to 1.0, preferably about 0.70 to 0.90. I.V. as used herein is measured at 25° C. using 0.50 g of polymer per 100 mL of a solvent consisting of 60% by weight phenol and 40% by weight tetrachloroethane.

Figure 1:
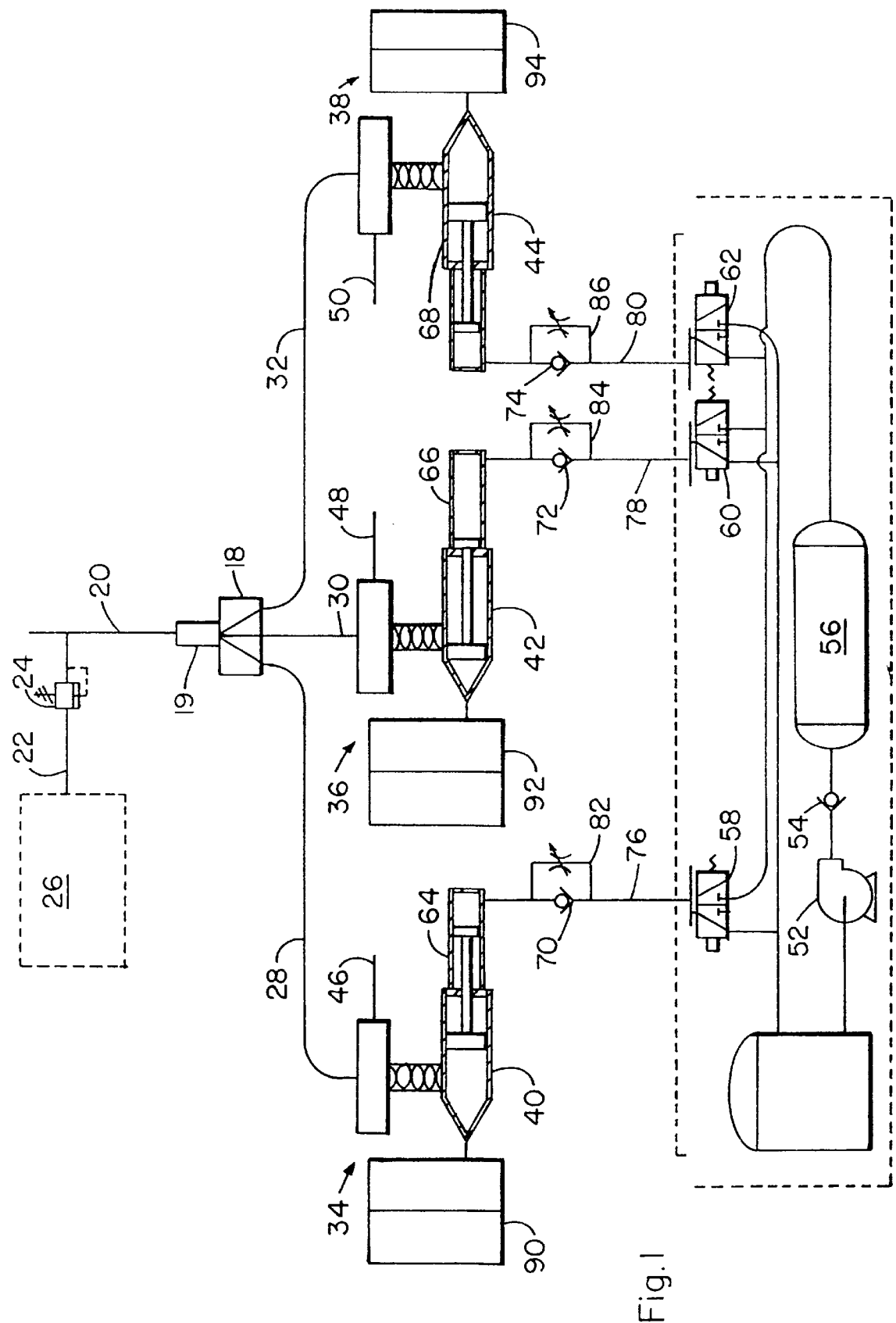
FIG. 1 is a diagram illustrating the flow pattern of molten thermoplastic material in accordance with the present invention.
Figure 2:
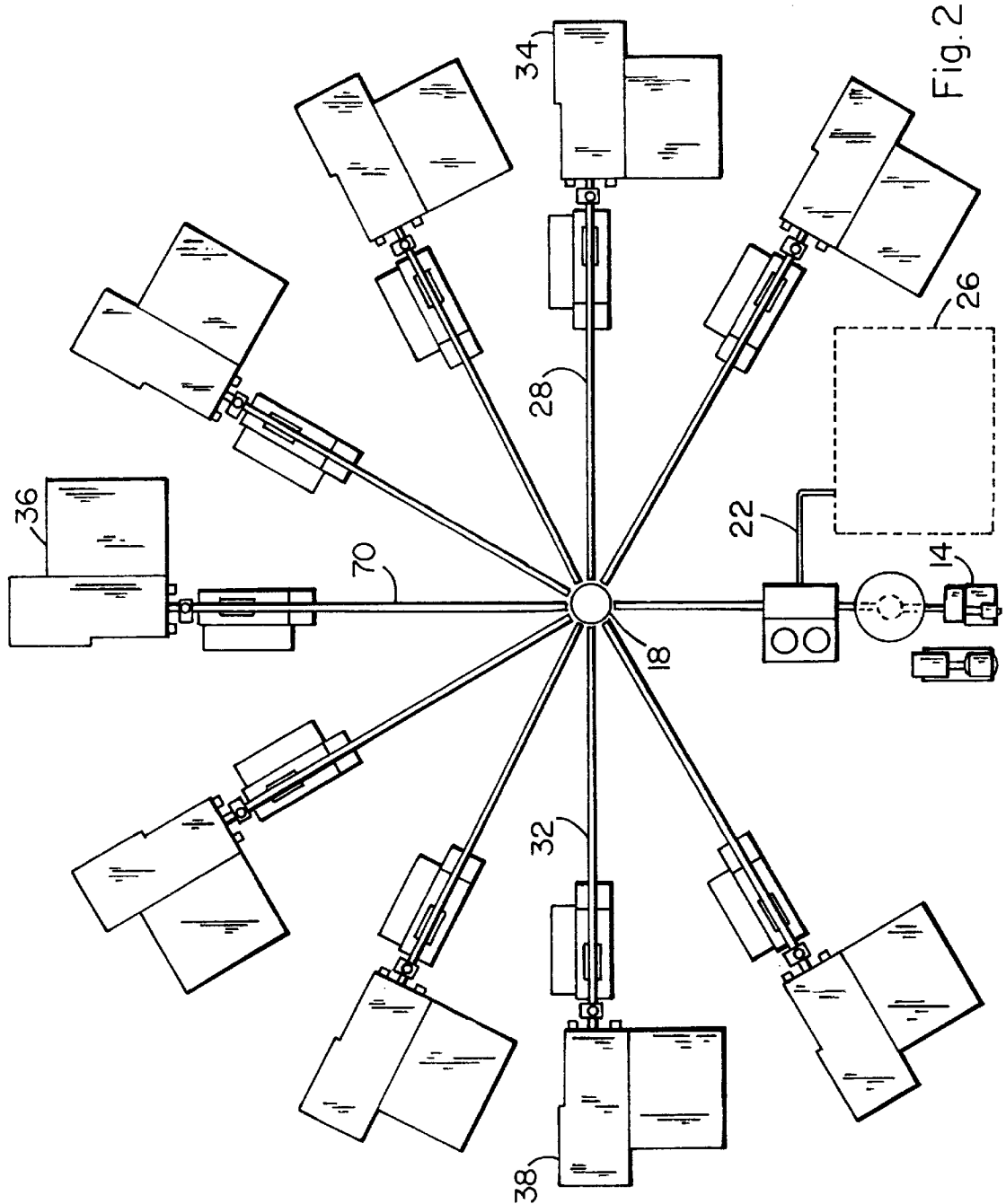
FIG. 2 is a diagram illustrating the manner in which molten thermoplastic material is continuously fed from a melt polymerization reactor forming a continuous supply through a distributor into a plurality of molding machines.

Referring to FIGS. 1 and 2 molten polyester is withdrawn from a melt polymerization reactor (not shown) and provided to the distribution system via pump 14 through supply conduit 20. The molten polyester in conduit 20 is provided to distributor 18 which preferably is provided with a line 22 leading through relief valve 24 to a pelletizer 26, which is useful for diverting the molten thermoplastic material from the distribution system during start-up or system upsets. The relief line is critical as conventional melt polymerization reactors produce thousands of pounds of polyester at once. Any upset in the distribution system would also shut down the polymerization reactor. This diverted material may be solidified and pelletized in conventional manner for disposal or later use.

The molten thermoplastic material flows through a mixer 19, preferably a static mixer, construction of which is well known in the art, just prior to entering the distributor 18 to insure homogeneity.

Although the apparatus and method described herein is generally described in reference to a nine station system (nine molding machines), it should be understood that the number of stations is not critical. For example, as few as 2 may be used. However, in FIG. 1, only three stations are illustrated with the understanding that the rest of the stations would be of like construction.

From the distributor 18, the molten material flows through conduits 28, 30 and 32 to molding machines 34, 36 and 38 respectively. Static mixing devices (not shown) may also be used if desired as the material enters the injectors 40, 42 and 44 respectively. although not required in this invention, purge lines 46, 48 and 50 may be connected to conduits 28, 30 and 32 respectively to handle waste material after a machine is shut down for maintenance or repairs.

The injectors are operated, or actuated, in predetermined sequence by a hydraulic system which is timed, preferably in a conventional manner by a computer system, to move the rams, or plungers of each to result in a continuous flow of molten material from the distributor 18. The hydraulic system is conventional, and is operated by a pump 52 through a system which forces hydraulic fluid through check valve 54 through accumulator 56 into solenoid-operated, 3-way valves 58, 60 and 62 which serve injectors 64, 66 and 68 respectively. It is the solenoid valves which are operated in timed sequence, preferably by a computer, to allow hydraulic fluid to be supplied to the hydraulic cylinders of the injectors in predetermined timed sequence. Flow control values 70, 72 and 74 are placed in hydraulic lines 76, 78 and 80 which, in combination with bypasses 82, 84 and 86 respectively allow hydraulic fluid to pass under sufficient pressure to force the pistons of injectors 64, 66 and 68 in a direction to force molten thermoplastic material into molds 90, 92 and 94 respectively. Upon completion of the injection stroke of each, the solenoid valves are actuated to allow pressure of the molten material to push the rams back for refilling the cylinders. This is accomplished by the hydraulic fluid flowing back through the flow control valve bypasses.

Figure 3:
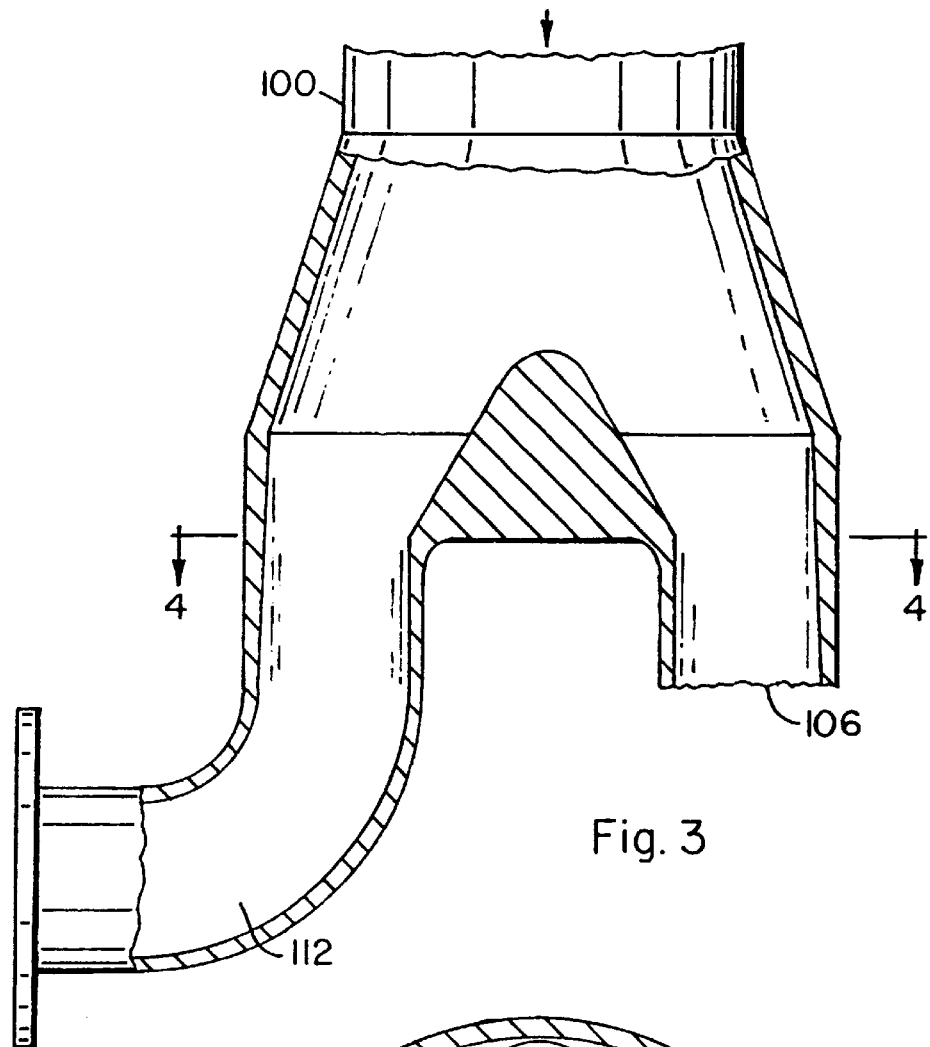
FIG. 3 is a sectional view of a distributor for directing flow of thermoplastic material to conduits leading to the molding machines.
Figure 4:
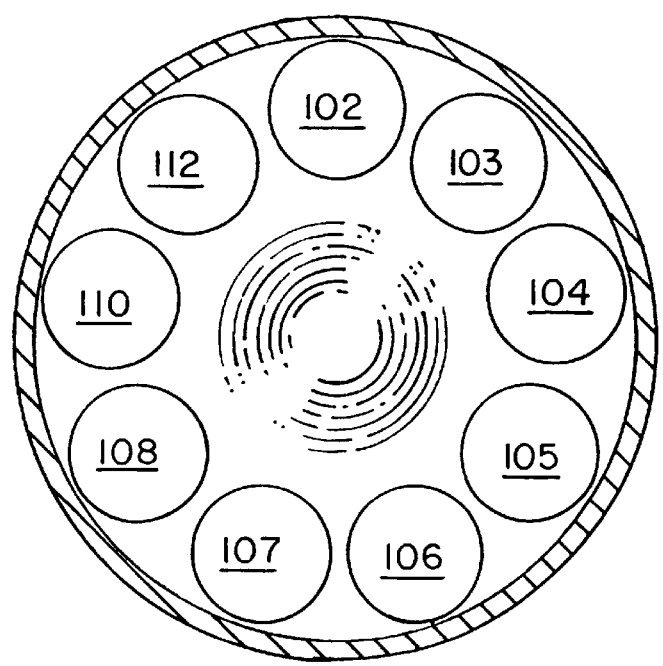
FIG. 4 is a sectional view taken along line 4—4 of FIG. 3.

Referring now to FIGS. 3 and 4, distributor 18 is shown having an inlet 100 and a plurality of outlets 102, 104, 106, 108, 110 and 112 for directing the flow of molten thermoplastic material to the individual molding machines. Distributor 18 may conveniently be what is sometimes called a distributor block, i.e., a solid block having a plurality of passages leading from inlet 100 to the outlets 102–112. The passages inside the distributor are gently curved to reduce the possibility of eddies occurring therein from the flow of material. Also, all the conduits leading from the supply to the molding machines are either straight or gently curved to reduce the possibility of eddies. Furthermore, the interior of the distributor and conduits is smooth. The distributor 18, as well as the conduits, may be heated if desired by using conventional heating means such as, for example, jackets provided with a heating material to keep the molten thermoplastic material at the desired temperature.

The molding machines may be conventional injection molding machines used to produce plastic parts. These machines are operated in a conventional manner by injecting a quantity of the molten thermoplastic material into the mold cavity, causing the molded article to solidify, and ejecting the molded article therefrom, after which the cycle is repeated. Handling of the molded article may be accomplished by conventional means well known to those skilled in the art, such as by a robot operating in a timed manner.

Figure 5:
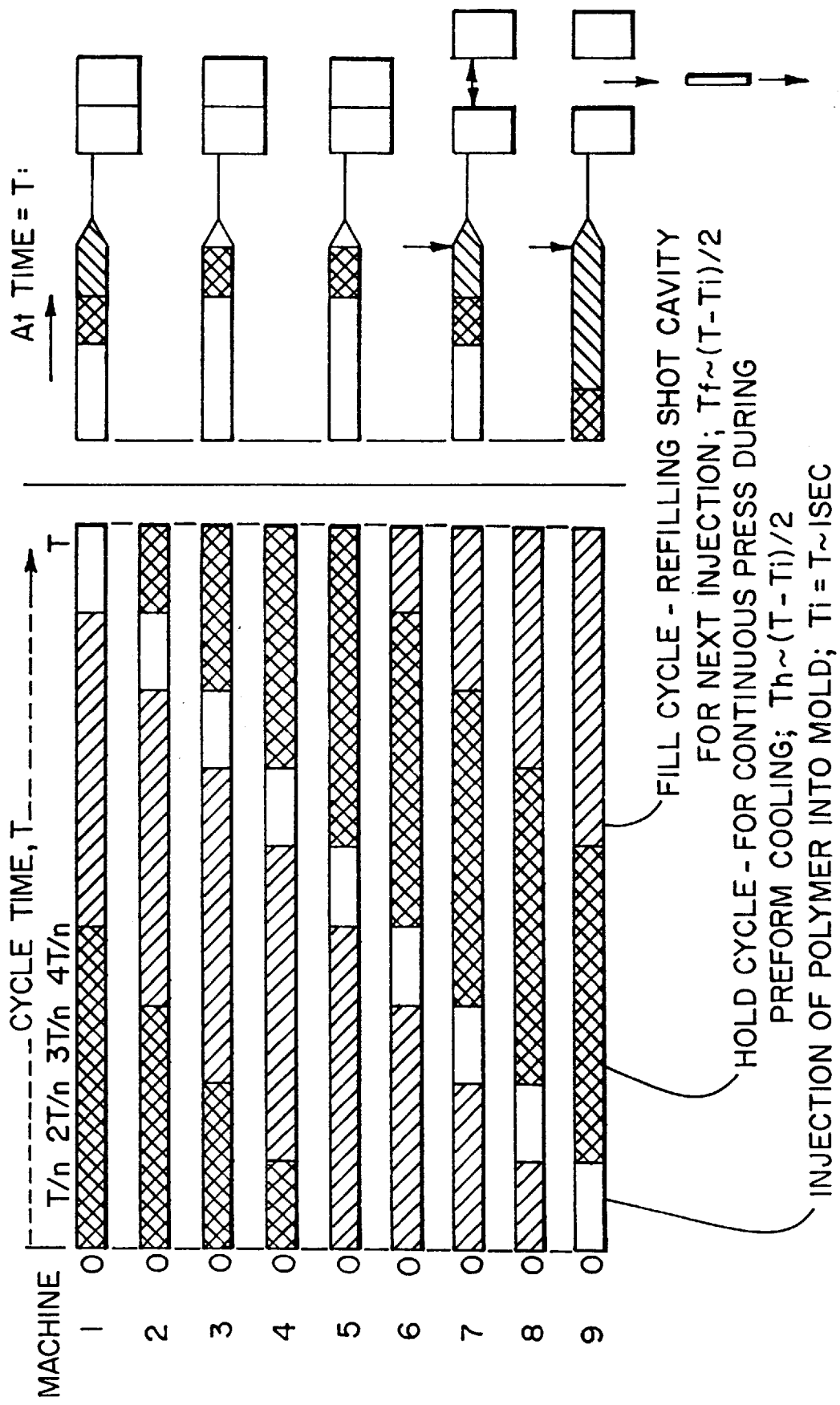
FIG. 5 is a diagram illustrating the sequence of actuating the molding machines in a sequence to accomplish substantially constant flow of molten thermoplastic material from the continuous supply.

Referring now to FIG. 5, a diagram is illustrated wherein the position of the injector ram of each molding machine is shown, whereby substantially constant flow of the material is accomplished. As described previously, the rams are operated in a sequence determined by the hydraulic actuating system, preferably timed in a programmed manner. The diagram on the left and its code is shown for the cycle time of each of the nine molding machines. However, for simplicity, only 5 molding machines, one for every other on the cycle diagram, are illustrated in the diagrams on the right. Cycle time T is calculated from the formula $T = (n \times w \times np) \div Q$ where
n=number of molding machines
w=weight of each preform
np=number of preforms per machine
Q=total polymer flow rate in
when one machine is down, such as for maintenance, T is reduced and the cycle frequency increases to maintain a constant Q.

Typical times are as follows:

Cycle Time = 22 sec.

Injection of Polymer into Mold – $Ti = \sim 1$ sec.

Hold Cycle for Continuous

Press During Perform Cooling – $Th = \sim \frac{(T-Ti)}{2}$

Fill Cycle, Refilling Shot Cavity for Next Injection – $Tf = \sim \frac{(T-Ti)}{2}$ Thus, the present invention discloses an apparatus and process for distribution and molding of molten thermoplastic material provided directly from melt polymerization.

The invention has been described in detail with particular reference to preferred embodiments thereof, but it will be understood that variations and modifications can be effected within the spirit and scope of the invention.

We claim:

1. Method for producing molded thermoplastic articles comprising
   a) supplying a continuous feed of molten thermoplastic material directly from melt polymerization,
   b) distributing said continuous feed to the intakes of a plurality of molding machines through conduits of substantially equal lengths and shaped to allow substantially uninterrupted flow of said material with substantially equal residence times therethrough, c) opening the intakes of each of said molding machines in a predetermined sequence to accept a charge of said material, d) molding one or more articles in at least two of said plurality of molding machines, and e) ejecting each of said articles after it is molded, wherein laid material flows substantial uninterrupted at a substantially constant rate during steps a), b), and c).

2. The method of claim 1 further comprising mixing said molten thermoplastic material just prior to distributing.

3. The method of claim 1 wherein said molten thermoplastic material is provided to step b without pelletization.

4. Apparatus for producing molded thermoplastic articles comprising a) supply means forming a continuous supply of molten thermoplastic material directly from melt polymerization at a substantially constant flow rate;

b) a distributor connected to said supply means by way of a supply conduit, said supply conduit constructed so as to allow a substantially uninterrupted flow of said material from said supply means into said distributor;

c) an overflow relief valve connected to said supply conduit at a position between said supply means and said distributor, said overflow relief valve positioned to allow said flow rate to remain substantially constant between said supply means and said distributor;

d) means for feeding said material to said distributor under pressure;

e) conduits connecting said distributor to intakes of a plurality of molding machines, said conduits being of substantially equal length and shape to allow substantially uninterrupted flow of said material with substantially equal residence time therethrough;

f) means for actuating each of the molding machines in a predetermined timed sequence to accept a charge of the material and form it into a molded article such that the flow of material through the distributor is substantially constant;

g) means for ejecting said molded article; and h) means for repeating steps f) and g) in sequence.

5. Apparatus according to claim 4 wherein the overflow relief valve is connected to a pelletizer, whereby said material may be diverted at selected times.

6. Apparatus according to claim 4 wherein said material is a polyester.

7. Apparatus according to claim 4 wherein said molding machine is an injection molding machine.

8. The apparatus of claim 4 further comprising a mixer disposed along said means for feeding and prior to said distributor.

* * * * *

UNITED STATES PATENT AND TRADEMARK OFFICE
CERTIFICATE OF CORRECTION

PATENT NO. : 5,928,596
DATED : July 27, 1999
INVENTOR(S) : Andrew Ervin McLeod, Douglas Mark Haseltine, Larry Cates Windes, Marc Alan Strand It is certified that error appears in the above-identified patent and that said Letters Patent is hereby corrected as shown below:

Column 5, Claim 1. e), line 7, "laid material flows substantial" should read ---said material flows substantially---

Column 6, Claim 4. e), line 5, "and shape to" should read ---and shaped to---

Signed and Sealed this

Seventh Day of December, 1999

Attest:

Q. TODD DICKINSON

*Attesting Officer*     *Acting Commissioner of Patents and Trademarks*